(12) United States Patent
Ganesan (10) Patent No.: US 9,396,823 B2
(45) Date of Patent: *Jul. 19, 2016

(54) FLOATING NUCLEAR POWER REACTOR WITH A SELF-COOLING CONTAINMENT STRUCTURE AND AN EMERGENCY HEAT EXCHANGE SYSTEM

(71) Applicant: Palvannanathan Ganesan, Omaha, NE (US)

(72) Inventor: Palvannanathan Ganesan, Omaha, NE (US)

(*) Notice: Subject to any disclaimer, the term of this patent is extended or adjusted under 35 U.S.C. 154(b) by 376 days.

This patent is subject to a terminal disclaimer.

(21) Appl. No.: 14/167,483

(22) Filed: Jan. 29, 2014

(65) Prior Publication Data

US 2015/0170773 A1    Jun. 18, 2015

Related U.S. Application Data

(63) Continuation-in-part of application No. 14/109,072, filed on Dec. 17, 2013.

(51) Int. Cl.
*G21C 15/18* (2006.01)
*G21D 1/00* (2006.01)
*G21C 13/02* (2006.01)

(52) U.S. Cl.
CPC  *G21D 1/00* (2013.01); *G21C 13/02* (2013.01); *G21C 15/18* (2013.01); *Y02E 30/40* (2013.01)

(58) Field of Classification Search
CPC ......... G21C 15/18; G21C 9/004; G21C 11/04
USPC ......... 376/247, 273, 282, 283, 293, 317, 909, 376/912
See application file for complete search history.

(56) References Cited

U.S. PATENT DOCUMENTS

| 3,047,485 | A | * | 7/1962 | Ellis | G21C 15/18 376/282 |
| 4,135,468 | A | * | 1/1979 | Kirby | B63B 25/006 114/260 |
| 2014/0328445 | A1 | * | 11/2014 | Haratyk | G21C 15/18 376/282 |
| 2015/0131769 | A1 | * | 5/2015 | Larrion | G21C 15/18 376/282 |

* cited by examiner

*Primary Examiner* — Jack W Keith
*Assistant Examiner* — Daniel Wasil
(74) *Attorney, Agent, or Firm* — Dennis L. Thomte; Thomte Patent Law Office LLC (57) ABSTRACT

A floating nuclear power reactor includes a self-cooling containment structure and an emergency heat exchange system. The containment structure of the reactor may be flooded upon the temperature or pressure in the containment structure reaching a certain level. The reactor vessel may also be flooded upon the temperature or pressure in the reactor vessel reaching a predetermined level. The reactor includes a heat exchange system and a filtered containment venting system.

9 Claims, 4 Drawing Sheets

FLOATING NUCLEAR POWER REACTOR WITH A SELF-COOLING CONTAINMENT STRUCTURE AND AN EMERGENCY HEAT EXCHANGE SYSTEM

CROSS REFERENCE TO RELATED APPLICATION

This is a Continuation-In-Part application of application Ser. No. 14/109,072, filed Dec. 17, 2013, entitled FLOATING NUCLEAR POWER REACTOR WITH A SELF-COOLING CONTAINMENT STRUCTURE.

BACKGROUND OF THE INVENTION

1. Field of the Invention

This invention relates to a floating nuclear power reactor and more particularly to a floating nuclear power reactor wherein the containment structure of the reactor is self-cooling. This invention relates even more particularly to an emergency heat exchange system for the nuclear power reactor.

2. Description of the Related Art

In most nuclear power reactors, a primary electrically operated water pump supplies cooling water to the reactor. In many cases, a secondary or back-up water pump is provided in case the primary water pump becomes inoperative. However, should the electrical power source for the water pump or water pumps be disrupted such as in a tsunami, a typhoon or an earthquake, the water pumps are not able to pump cooling water to the reactor which may result in a dangerous meltdown. Further, in some situations, the pipes supplying cooling water to the reactor may fail due to natural causes or a terrorist attack.

Currently, there are land based reactor cooling systems available which store water in a tank above the level of the reactor which will passively feed the reactor in case of pump or electricity failure. These tanks are designed to have enough water to cool the system for three days until help can arrive and more water can be pumped in from outside. The problem is that water stored in these tanks is of finite quantity. The tanks will work in case of an emergency shut down like in Fukushima, Japan, but will not work in the case of a pipe breakdown leaking a huge amount of water to the exterior. The reactor core will heat the water supplied from the tank and steam will escape via the pipe breakdown and the water will run out. Once the water runs out, the reactor core will melt due to overheating and explode. It is therefore necessary to be able to supply an infinite amount of water to compensate for lost water via a leaking pipe.

Further, current day reactors are protected by huge containment structures but this is not the answer to pipe breakdown outside or inside the containment chambers. A terrorist attack on the turbine room outside the containment structure is probably more dangerous than an attack on the containment structure since such an attack would result in multiple pipes breaking down, thereby breaking the water circuit between the reactor, turbine and condenser. Such an attack could also result in a breakdown of electrical control systems. This would result in the loss of circulating water to the reactor with the emergency stored water being unable to compensate for all the leaking pipes. In such a situation, the reactor will overheat without heat removal and explode.

The invention of the co-pending parent application represents a major improvement in the art. The instant invention represents a further improvement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A floating nuclear power reactor is disclosed. A nuclear power reactor is mounted or positioned on a floating barge-like vessel with the barge-like vessel having an upper end positioned above the water level of a body of water and a lower end positioned beneath the water level of the body of water. Side walls extend between the lower and upper ends of the floating vessel. The nuclear power reactor is positioned on the bottom of the barge-like vessel. The nuclear power reactor includes an upstanding concrete containment structure having a lower end, an upstanding sidewall, and an upper end. The confinement structure defines a sealed interior compartment. The lower end and a lower portion of the side wall of the containment structure are positioned below the water level of the body of water. An upstanding cylindrical, metal wall structure extends around the outer side of the concrete containment structure. A cover closes the upper end of the metal wall structure. The relationship of the metal wall structure, the upper outer portion of the containment structure and the cover define a vent chamber. The vent chamber is filled with a filter material such as stones or rocks, chemicals and water. One or more steam exhaust pipes extend outwardly from the upper end of the vent chamber through the cover to the atmosphere. A reactor vessel, having upper and lower ends, is positioned in the interior compartment of the containment structure with the reactor vessel being positioned below the water level of the body of water. The reactor vessel includes an interior compartment having upper and lower ends.

One or more steam exhaust pipes extend through the containment structure so that one end thereof is in communication with the upper end of the interior compartment thereof and so that the other end thereof is in communication with the vent chamber. One or more return pipes are associated with the reactor vessel so that one end thereof is in communication with the upper end of the interior compartment of the reactor vessel and so that the other end is in communication with the lower end of the interior compartment of the reactor vessel. In the preferred embodiment, one of the return pipes is of the closed loop type. A portion of the return pipe is positioned in the interior compartment of the containment structure. The return pipes form a heat exchanger system. A steam exhaust pipe extends from the upper end of the interior compartment of the reactor vessel outwardly through the containment structure to a turbine. A steam by-pass pipe extends from the steam exhaust pipe, which extends to the turbine, to the vent chamber. A normally closed first valve is imposed in the steam by-pass pipe. A normally open second valve is imposed in the steam exhaust pipe, which extends to the turbine, outwardly of the containment structure. A first water passageway, having inner and outer ends, extends through the bottom of the floating vessel and the bottom of the containment structure with the outer end of the first water passageway being in fluid communication with the body of water. The inner end of the first water passageway is in fluid communication with the interior compartment of the containment structure. A spring-loaded first hatch is movably mounted on the exterior of the side wall of the vessel at the outer end of the first water passageway. The first hatch is movable between a closed position and an open position. The first hatch, when in its closed position, closes the outer end of the first water passageway. The first hatch, when in its open position, permits water from the body of water to flow inwardly through the first water passageway into the interior compartment of the containment structure to cool the reactor vessel.

A first latching means is associated with the first hatch with the first latching means being movable between a latched position and an unlatched position. The first latching means, when in its latched position, maintains the first hatch in its closed position. The first latching means, when in its unlatched position, permits the first hatch to move from its closed position to its open position. A first condition responsive actuator is associated with the first latching means to move the first latching means from its latched position to its unlatched position upon the condition, either temperature or pressure, in the containment structure reaching a predetermined level. Although a single first water passageway is disclosed, a plurality of first water passageways could be utilized.

A second water passageway, having inner and outer ends, extends through the bottom of the vessel, through the bottom of the containment structure, and into the interior compartment of the reactor vessel. A second hatch is movably mounted in the second water passageway. The second hatch is movable between a closed position and an open position. The second hatch closes the outer end of said second water passageway when in its closed position. The second hatch, when in its open position, permits water from the body of water to flow inwardly into the interior compartment of the reactor vessel to cool the reactor vessel. A second latching means is associated with the second hatch which is movable from a latched position to an unlatched position. The second latching means, when in its latched position, maintains the second hatch in its closed position. The second latching means, when in its unlatched position, permits the second hatch to move from its closed position to its open position. A condition, either temperature or pressure, responsive actuator is associated with the second latching means to move the second latching means from its latched position to its unlatched position upon the condition within the interior compartment of the reactor vessel reaching a predetermined level. Although a single second water passageway is disclosed, a plurality of second water passageways could be utilized.

It is therefore a principal object of the invention to provide an improved floating nuclear power reactor.

It is another object of the invention to provide an infinite supply of cooling water to the reactor in case of the reactor overheating A further object of the invention is to provide a floating nuclear power reactor which is self-cooling upon the temperature or pressure reaching a predetermined level in the containment structure or reactor vessel of the nuclear power reactor.

A further object of the invention is to provide a self-cooling nuclear power reactor including an emergency heat exchange system.

A further object of the invention is to provide a self-cooling nuclear power reactor including a filtered containment venting system.

These and other objects will be apparent to those skilled in the art. These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a floating vessel such as a barge as shown in the co-pending application Ser. No. 14/109,072, filed Dec. 17, 2013, entitled FLOATING NUCLEAR POWER REACTOR WITH A SELF-COOLING CONTAINMENT STRUCTURE. Barge 10 could be a ship hull or other floating structure. The details of the barge will not be described other than to say that the barge includes a bottom 12, upstanding ends, and upstanding sides. One of the ends 14 of the barge is shown in the drawings. Barge 10 may be constructed of any suitable material such as steel, concrete, etc.

Barge 10 is shown as floating in a body of water 16 such as a lake, ocean, etc. For reference purposes, the body of water 16 will be described as having a water level 18. As seen, the upper end of barge 10 is positioned above the water level 18 with a majority of the barge 10 being submerged in the body of water 16.

A nuclear power reactor 22 is positioned on the barge 10 as shown. Normally, a second power reactor would also be positioned on the barge 10 such as shown in the co-pending application. Reactor 22 includes a cylindrical metal housing 24 which includes the end wall 14, which extends upwardly from bottom 12 and which has an open upper end 26 positioned above the water level 18. A cover or lid 28 closes the open upper end 26 of housing 24.

Reactor 22 includes an upstanding containment structure 30 constructed of concrete and which includes a bottom 32, an upstanding side wall 34, and an upper end 36 which defines a sealed interior compartment 38. A reactor vessel 40 is positioned in compartment 38 and includes an open bottom 42, side wall 44 and upper end 46 which define a sealed interior compartment 48. As seen, the bottom 42 of reactor vessel 40 is positioned on the upper end of bottom 32 of containment structure 30.

Figure 1:
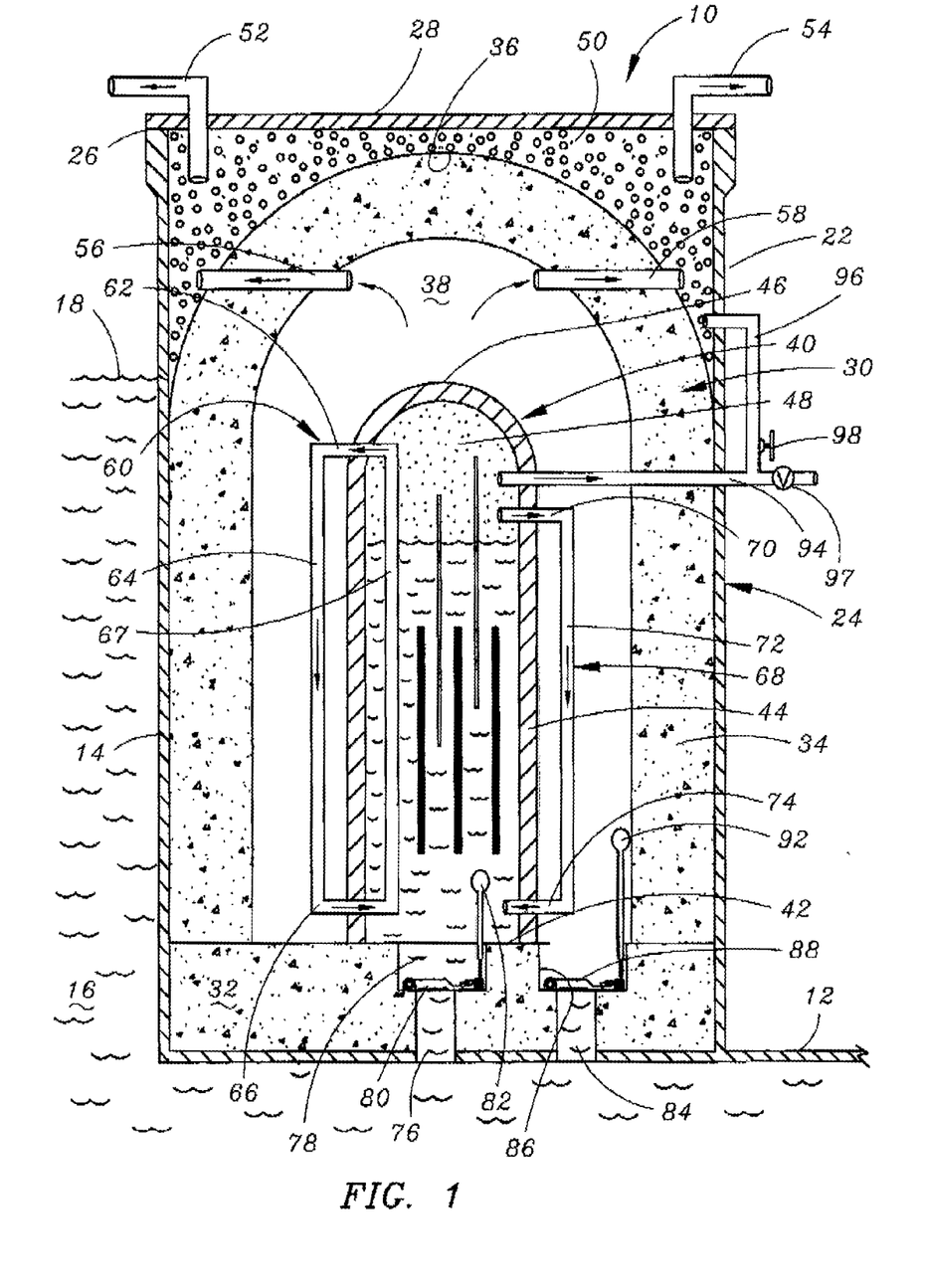
FIG. 1 is a sectional view of the floating nuclear power reactor of this invention in a normal operating condition.

As seen, a portion of the exterior of side wall 34 of containment structure 30 engages the interior of housing 24 to create a vent chamber 50. Vent chamber 50 is filled with rocks, chemicals and water to define a filtered containment venting system. A steam exhaust pipe 52 has its inner end in communication with vent chamber 50 and has its outer end in communication with the atmosphere as shown in FIG. 1. A steam exhaust pipe 54 has its inner end in communication with vent chamber 50 and has its outer end in communication with the atmosphere. Although two steam exhaust pipes 52 and 54 are shown and described, any number of steam exhaust pipes may be utilized.

The numeral 56 refers to a steam exhaust pipe which extends through containment structure 30 adjacent the upper end thereof so that the inner end of steam exhaust pipe 56 is in communication with the upper end of compartment 38 and so that the outer end of steam exhaust pipe 56 is in communication with vent chamber 50. A steam exhaust pipe 58 extends through containment structure 30 adjacent the upper end thereof so that the inner end of steam exhaust pipe 58 is in communication with compartment 38 and so that the outer end of steam exhaust pipe 58 is in communication with vent chamber 50. Although two steam exhaust pipes 56 and 58 are shown and described, any number of those steam exhaust pipes could be utilized.

The numeral 60 refers to a return pipe having pipe portions 62, 64, 66 and 67. Pipe portion 62 extends outwardly from compartment 48 adjacent the upper end of side wall 44 thereof. Pipe portion 64 extends downwardly from the outer end of pipe portion 62 in interior compartment 38, as seen in the drawings. Pipe portion 66 extends inwardly from the lower end of pipe portion 64, through side wall 44 into compartment 48 at the lower end thereof. Pipe portion 67 extends upwardly from the inner end of pipe portion 66 to the inner end of pipe portion 62 to form a closed-loop return pipe. Return pipe 60 is filled with a suitable coolant material such as water, sodium or the like. Although a single return pipe 60 is shown, more than one return pipes 60 could be utilized. The numeral 68 refers to a steam return pipe having pipe portions 70, 72 and 74. Pipe portion 70 extends outwardly from interior compartment 48 adjacent the upper end of side wall 44 of reactor vessel 40. Pipe portion 72 extends downwardly from the outer end of pipe portion 70, as seen in the drawings, so that pipe portion 72 is in interior compartment 38 of containment structure 30. Pipe portion 74 extends inwardly from the lower end of pipe portion 72 through side wall 44 into compartment 48 at the lower end thereof. If desired, the inner ends of pipe portions 70 and 74 could be connected together by a pipe so that the return pipe is a closed loop system. Although a single steam return pipe 68 is shown and described, any number of the steam return pipes 68 could be utilized.

A water passageway 76 extends upwardly through bottom 12 of barge 10 and through bottom 32 of containment structure 30. The inner end of passageway 76 communicates with a larger water passageway 78, which communicates with the interior compartment 48 of reactor vessel 40. A spring-loaded hatch 80, which is identical to that shown and described in the co-pending application, is positioned in water passageway 78 to close water passageway 76. Hatch 80 includes a spring (not shown) which urges hatch 80 to its open position. A latching means (not shown), which is identical to that shown in the co-pending application, is associated with the hatch 80 with the latching means being movable between a latched position and an unlatched position as described in the co-pending application. The latching means, when in its latched position, maintains the hatch 80 in its closed position. The latching means, when in its unlatched position, permits the hatch 80 to move from its closed position to its open position. A condition responsive actuator 82, identical to that shown and described in the co-pending application, is associated with the latching means to move the latching means from its latched position to its unlatched position upon the condition, either pressure or temperature, in the interior compartment 48 of reactor vessel 40 reaching a predetermined level.

A water passageway 84 extends upwardly through bottom 12 of barge 10 and through bottom 32 of containment structure 30. The inner end of passageway 84 communicates with a larger passageway 86, which communicates with the interior compartment 38 of containment structure 30. A spring loaded hatch 88, which is identical to that shown in the co-pending application, is positioned in the water passageway 86 to close water passageway 84. Hatch 88 includes a spring (not shown), which urges hatch 88 to its open position. A latching means, identical to that shown in the co-pending application, is associated with the hatch 88 with the latching means being movable between a latched position and an unlatched position. The latching means, when in its latched position, maintains the hatch 88 in its closed position. The latching means, when in its unlatched position, permits the hatch 88 to move from its closed position to its open position. A condition responsive actuator 92, which is identical to that shown and described in the co-pending application, is associated with the latching means to move the latching means from its latched position to its unlatched position, upon the condition, either temperature or pressure, in the interior compartment 38 of containment structure 30 reaching a predetermined level.

The numeral 94 refers to a steam exhaust pipe which extends from the upper end of interior compartment 48 of reactor vessel 40 to a conventional turbine. As seen, steam pipe 94 extends outwardly through side wall 44 of reactor vessel 40, through interior compartment 38, through containment structure 30, and through housing 24. A steam by-pass or vent pipe 96 extends upwardly from steam exhaust pipe 94 and passes through housing 24 into the lower end of vent chamber 50 as seen in the drawings. A normally open valve 97, which is manually or electrically operated, is imposed in pipe 94. A normally closed valve 98 is imposed in vent pipe 96.

The instant invention functions as will be described. FIG. 1 illustrates the instant nuclear power reactor in its normal operating mode. In that mode: (1) hatches 80 and 88 are closed; (2) the return pipes 60 and 68 will not be functioning since pipe portions 64 and 72 are not being cooled by any surrounding coolant (water) and will stay at the same temperature as the reactor coolant; (3) valve 97 will be open and valve 98 will be closed; (4) steam exhaust pipes 56 and 58 will be inactive; (5) and the core of the reactor vessel will heat the water in the interior compartment thereof so that steam is created and passed to the turbine through steam exhaust pipe 94.

Figure 2:
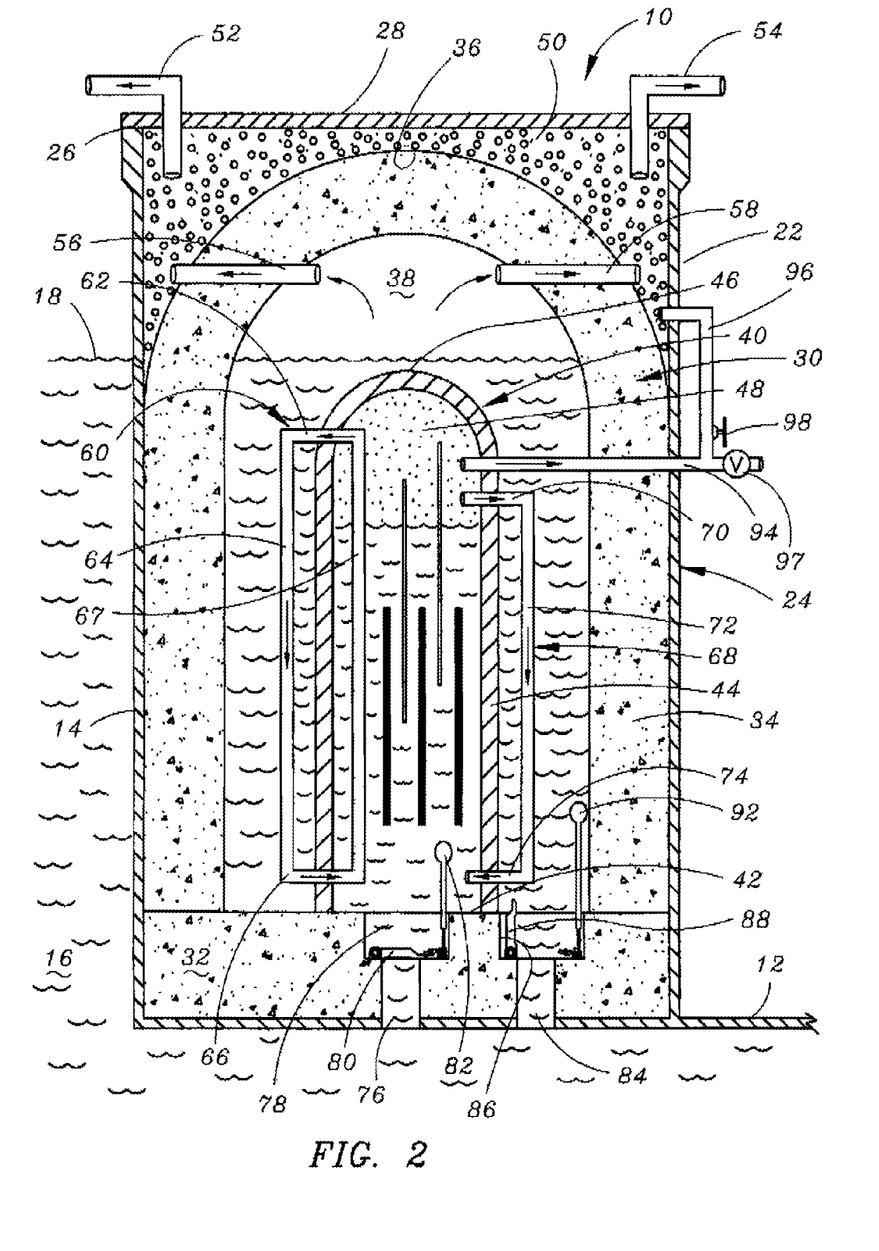
FIG. 2 is a view similar to FIG. 1 except that the interior compartment of the containment structure has been flooded.

The condition responsive actuator 92, upon sensing a predetermined level of pressure or temperature in interior compartment 38, will unlatch the latching means associated with hatch 88, to open hatch 88 thereby creating a temporary pool of water in interior compartment 38 of containment structure 30. The temporary pool of water in interior compartment 38 surrounds reactor vessel 40 to cool reactor vessel 40. Reactor vessel 40 is further cooled by the return pipe 60. As the material in pipe portion 67 is heated by the core of the reactor vessel 40, the material will rise in pipe portion 67 and will pass outwardly through pipe portion 62 and thence downwardly through pipe portion 64. The material in pipe portion 64, as it moves downwardly in pipe portion 64, will be cooled since pipe portion 64 is surrounded by the flood water in interior compartment 38. The cooled material will then pass from the lower end of pipe 64 into the interior compartment 48 of reactor vessel 40. As the cooled material in pipe portion 67 cools the core of the reactor vessel as the material in 67 is heated, the material will rise upwardly through pipe portion 67 and thence again move outwardly through pipe portion 62. The heating and cooling of the material in return pipe 60 causes a continual flow of the material through the heat exchanger system created by return pipe 60. The return pipe 68 functions similarly to return pipe 60 except that return pipe 68 is an open return system rather than a closed loop system as is pipe 60. Steam from interior compartment 48 exits outwardly therefrom by way of pipe portion 70. The steam then passes downwardly through pipe portion 72 which is cooled by the flood water in interior compartment 38. As the steam moves downwardly in pipe portion 72, it is cooled and turns to liquid, with the cooled liquid being returned to the interior compartment 48 of reactor vessel 40 to cool the reactor vessel. The water in interior compartment 38 gets hot in this process and evaporates or turns into steam. This heated water has not been in contact with radioactive material. However, to be safe, the steam in interior compartment 38 is vented into chamber 50 and is filtered by the filter material in chamber 50 and is passed to the atmosphere by way of the steam exhaust pipes 52 and 54. This process is continued until the temperature in the reactor vessel 40 comes down.

Figure 3:
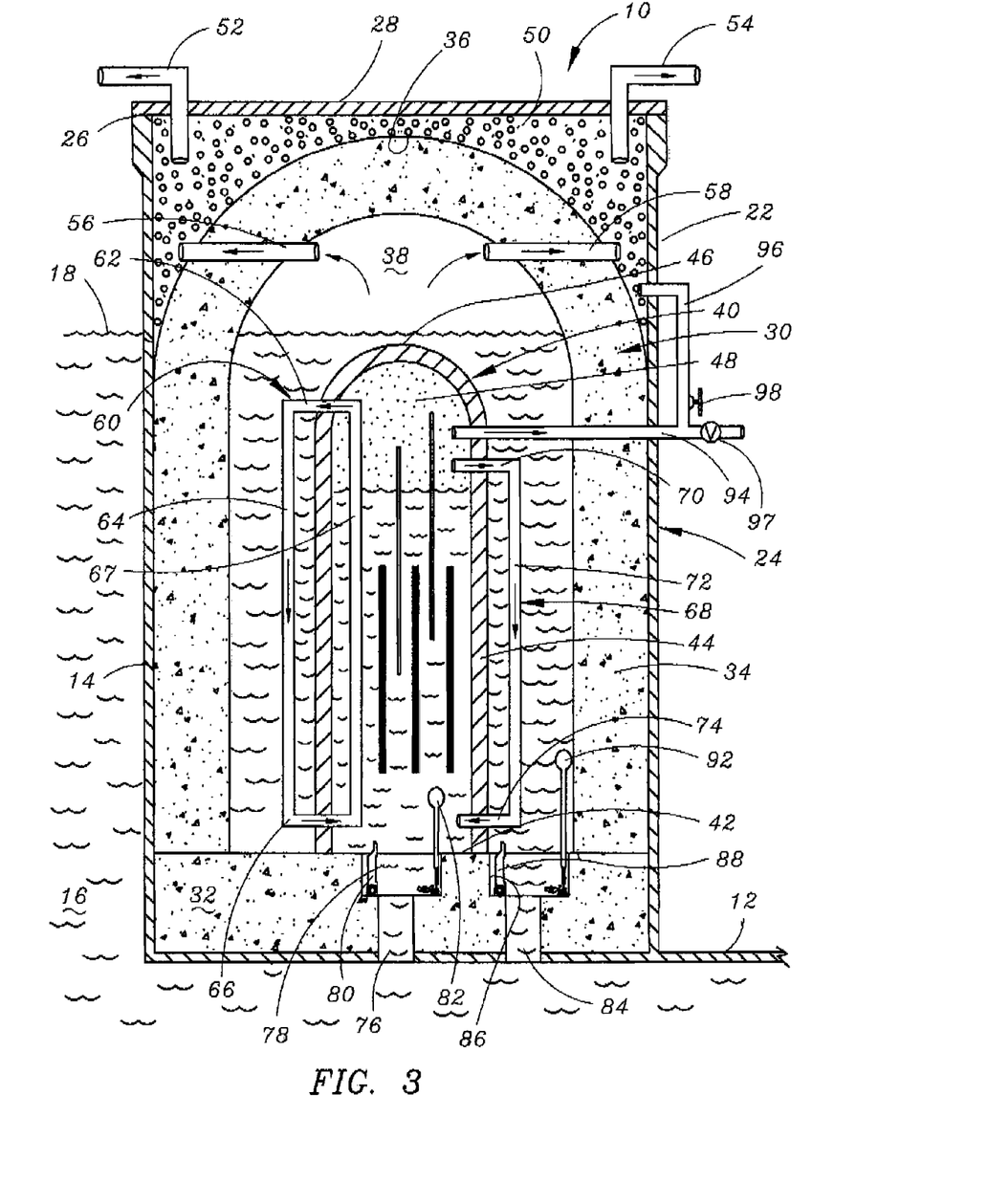
FIG. 3 is a view similar to FIG. 2 except that the interior compartment of the reactor vessel has also been flooded.

The trigger point set to open hatch 88 will be much lower than the trigger point set to open the hatch 80. In this way, there is no sea water entry into the reactor vessel. In the very unlikely scenario that the above described process is unable to cool the core of the reactor vessel 40, and the temperature in the reactor vessel rises, the trigger point to open the hatch 80 would become operational (at the upper safety margins). When water enters reactor vessel, it will evaporate and steam goes into steam exhaust pipe 70 and to the turbine. By opening valve 98, steam passes into the vent chamber 50 where it is filtered and then vented to the atmosphere by way of steam pipes 52 and 54. The filter material in vent chamber 50 and the venting of the steam thereof functions as a filtered containment venting system.

In the event that there is a pipe breakage or leakage in pipe 94 downstream of the reactor, valve 97 may be closed and valve 98 opened so that the steam from the upper end of interior compartment will be vented through pipe 96 and passed through the filter material in vent chamber 50 and thence to the atmosphere by way of steam exhaust pipes 56 and 58.

Although the foregoing description explains the hatches and the actuation of those hatches in detail, it should be noted that the hatches could be opened by means other than that shown. For example, the hatches could be operated by electrical means or by other mechanical means.

Further, the barge could be submerged so that the bottom thereof rests on the floor of the body of water. In that case, the hatches would be formed in the side of the barge as disclosed in the co-pending application.

Figure 4:
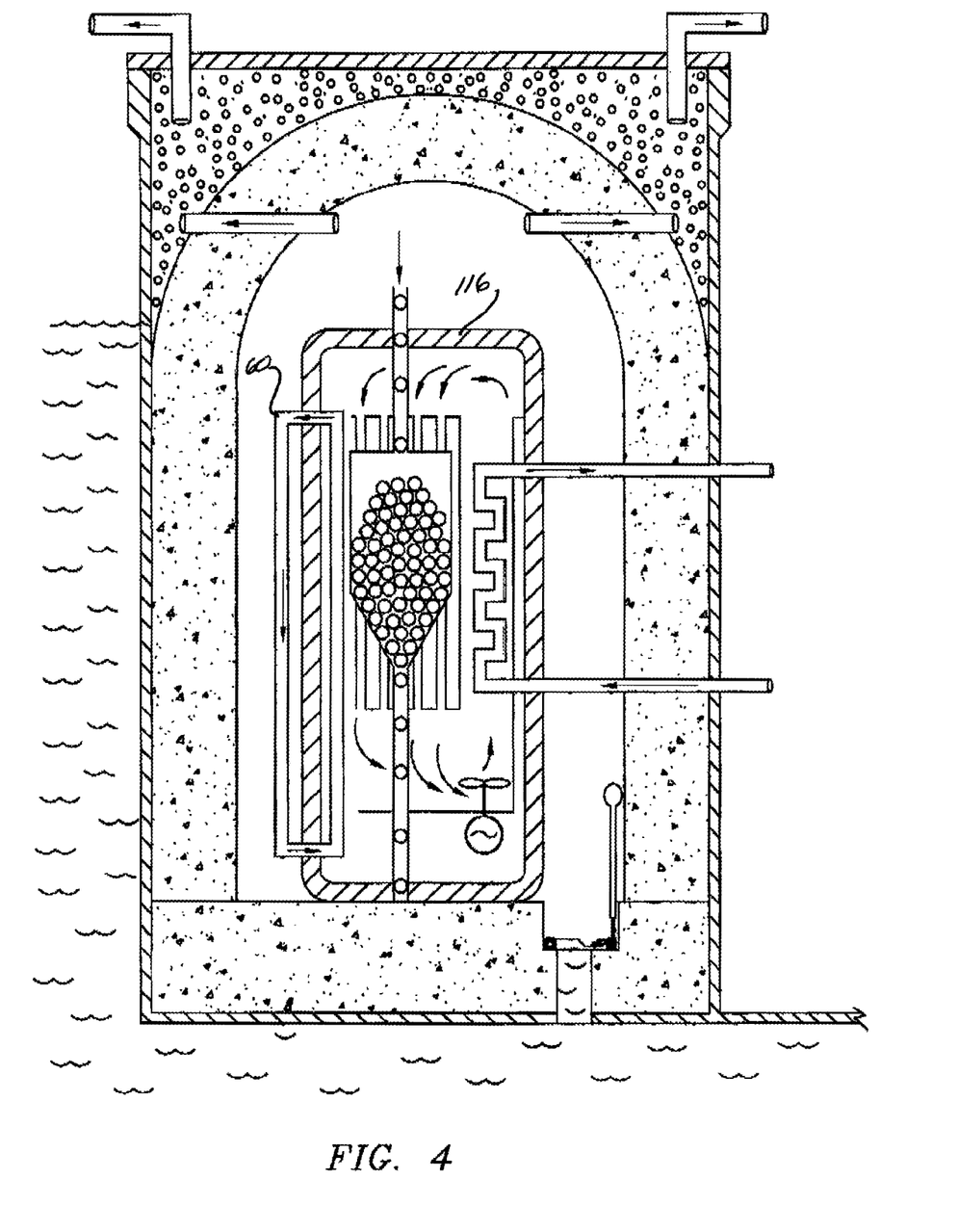
FIG. 4 is a sectional view illustrating a pebble bed reactor with a heat exchange system.

FIG. 4 illustrates a modified form of the reactor which is of the pebble bed type. In the pebble bed type reactor of FIG. 4, the interior compartment of the containment structure can be flooded so that the fluid filled closed-loop heat exchanger 60 will be cooled by the water in the interior compartment of the containment structure upon the interior compartment being flooded by way of the water passageway and hatch being opened.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:
1. A floating nuclear power reactor, comprising:
a floating vessel having a bottom positioned beneath the water level of a body of water, sides extending upwardly from said bottom, and an upper end which is positioned above the water level of the body of water;
said floating vessel including an upstanding cylindrical support structure having a lower end, an upstanding cylindrical side wall, having inner and outer surfaces, and a closed upper end;
a nuclear power reactor positioned within said cylindrical support structure;
said nuclear power reactor including an upstanding containment structure having a lower end positioned on said bottom of said floating vessel, an upstanding side wall, having upper and lower ends, which is in engagement with said inner surface of said side wall of said cylindrical support structure and a domed upper end;
said containment structure defining a sealed interior compartment, having upper and lower ends;
said domed upper end of said containment structure and said upper end of said side wall of said cylindrical support structure and said closed upper end of said cylindrical support structure defining a vent chamber;
said vent chamber being filled with a filter material;
at least one first steam exhaust pipe extending from said vent chamber to the atmosphere;
at least one second steam exhaust pipe extending from said upper end of said interior compartment of said containment structure into said vent chamber;
an upstanding reactor vessel, having upper and lower ends, is positioned in said interior compartment of said containment structure;
said reactor vessel having an interior compartment with upper and lower ends;
a third steam exhaust pipe extending from said upper end of said interior compartment of said reactor vessel outwardly through said containment structure to a turbine;
a normally open valve imposed in said third steam exhaust pipe;
a by-pass steam exhaust pipe extending from said third steam exhaust pipe, outwardly of said containment structure, to said vent chamber;
a normally closed valve in said by-pass steam exhaust pipe;
at least one first return pipe, filled with a liquid, extending outwardly from said upper end of said interior compartment of said reactor vessel into said interior compartment of said containment structure, thence downwardly, and thence inwardly into said interior compartment of said reactor vessel at said lower end thereof, and thence upwardly within said interior compartment of said reactor vessel to form a closed loop return pipe;
a first water passageway, having inner and outer ends, extending through said bottom of said containment structure;
said outer end of said first water passageway being in fluid communication with the body of water;
said inner end of said first water passageway being in fluid communication with said interior compartment of said containment structure;
a normally closed first hatch associated with said first water passageway;
said first hatch being movable between a closed position and an open position;
said first hatch, when in said closed position, closing said first water passageway;

said first hatch, when in said open position, permitting water from the body of water to flow inwardly through said first water passageway into said interior compartment of said containment structure;
a second water passageway, having inner and outer ends, extending through said bottom of said containment structure;
said outer end of said second water passageway being in fluid communication with the body of water;
said inner end of said second water passageway being in fluid communication with said interior compartment of said reactor vessel;
a normally closed second hatch movably associated with said second water passageway;
said second hatch being movable between a closed position and an open position;
said second hatch, when in said closed position, closing said second water passageway;
said second hatch, when in said open position, permitting water from the body of water to flow inwardly through said second water passageway into said interior compartment of said reactor vessel;
said first hatch being movable from its said closed position to its said open position when a condition within said interior compartment of said containment structure reaches a predetermined level thereby permitting water from the body of water to flow into said interior compartment of said containment structure; and
said second hatch being movable from its said closed position to its said open position when a condition within said interior compartment of said reactor vessel reaches a predetermined level thereby permitting water from the body of water to flow into said interior compartment of said reactor vessel.

2. The floating nuclear power reactor of claim 1 wherein the predetermined condition level within said interior compartment of containment structure is lower than the predetermined condition level of within said interior compartment of said reactor vessel whereby said first hatch will move from its said closed position to its said open position prior to said second hatch moving from its said closed position to its said open position so that said interior compartment of said containment structure will be flooded prior to said interior compartment of said reactor vessel being flooded.

3. The floating nuclear power reactor of claim 1 wherein a plurality of first steam exhaust pipes extend from said vent chamber to the atmosphere.

4. The floating nuclear power reactor of claim 1 wherein a plurality of second steam exhaust pipes extend from said upper end of said interior compartment of said containment structure into said vent chamber.

5. The floating nuclear power reactor of claim 1 wherein said filter material is comprised of rocks, chemicals and water.

6. The floating nuclear power reactor of claim 1 wherein at least one second return steam pipe extends outwardly from said upper end of said interior compartment of said reactor vessel, thence downwardly, and thence inwardly into said interior compartment of said reactor vessel at said lower end thereof.

7. The floating nuclear power reactor of claim 1 wherein a valve is imposed in said third steam exhaust pipe.

8. The floating nuclear power reactor of claim 7 wherein said valve is imposed in said third steam exhaust pipe outwardly of said containment structure.

9. A floating nuclear power reactor, comprising;
a floating vessel having a bottom positioned beneath the water level of a body of water, sides extending upwardly from said bottom, and an upper end which is positioned above the water level of the body of water;
said floating vessel including an upstanding cylindrical support structure having a lower end, an upstanding cylindrical side wall, having inner and outer surfaces, and a closed upper end;
a nuclear power reactor positioned within said cylindrical support structure;
said nuclear power reactor including an upstanding containment structure having a lower end positioned on said bottom of said floating vessel, an upstanding side wall, having upper and lower ends, which is in engagement with said inner surface of said side wall of said cylindrical support structure and a domed upper end;
said containment structure defining a sealed interior compartment, having upper and lower ends;
said domed upper end of said containment structure and said upper end of said side wall of said cylindrical support structure and said closed upper end of said cylindrical support structure defining a vent chamber;
said vent chamber being filled with a filter material;
at least one first steam exhaust pipe extending from said vent chamber to the atmosphere;
at least one second steam exhaust pipe extending from said upper end of said interior compartment of said containment structure into said vent chamber;
an upstanding reactor vessel, having upper and lower ends, in said interior compartment of said containment structure;
said reactor vessel having an interior compartment with upper and lower ends;
a third steam exhaust pipe extending from said upper end of said interior compartment of said reactor vessel outwardly through said containment structure to a turbine;
a by-pass steam exhaust pipe extending from said third steam exhaust pipe, outwardly of said containment structure, to said vent chamber;
a normally closed valve in said by-pass steam exhaust pipe;
at least one first return pipe, filled with a liquid, extending outwardly from said upper end of said interior compartment of said reactor vessel into said interior compartment of said containment structure, thence downwardly, and thence inwardly into said interior compartment of said reactor vessel at said lower end thereof, and thence upwardly within said interior compartment of said reactor vessel to form a closed loop return pipe;
a first water passageway, having inner and outer ends, extending through said bottom of said containment structure;
said outer end of said first water passageway being in fluid communication with the body of water;
said inner end of said first water passageway being, in fluid communication with said interior compartment of said containment structure;
a normally closed first hatch associated with said first water passageway;
said first hatch being movable between a closed position and an open position;
said first hatch, when in said closed position, closing said first water passageway;
said first hatch, when in said open position, permitting water from the body of water to flow inwardly through said first water passageway into said interior compartment of said containment structure;

said first hatch being movable from its said closed position to its said open position upon the temperature or pressure in said interior compartment of said containment structure reaching a predetermined level;
a second water passageway, having inner and outer ends, extending through said bottom of said containment structure;
said outer end of said second water passageway being in fluid communication with the body of water;
said inner end of said second water passageway being in fluid communication with said interior compartment of said reactor vessel;
a normally closed second hatch movably associated with said second water passageway;
said second hatch being movable between a closed position and an open position;
said second hatch, when in said closed position, closing said second water passageway;
said second hatch, when in said open position, permitting water from the body of water to flow inwardly through said second water passageway into said interior compartment of said reactor vessel; and
said second hatch being movable from its said closed position to its said open position upon the temperature or pressure in said interior compartment of said reactor vessel reaching a predetermined level.

\* \* \* \* \*